US006896388B2

(12) United States Patent

George et al.

(10) Patent No.: US 6,896,388 B2

(45) Date of Patent: May 24, 2005

(54) PATH MARKING AND LIGHTING SYSTEM

(75) Inventors: Douglas A. George, Watertown, CT (US); Gustaf T. Appelberg, Fairfield, CT (US); Joseph W. Fleming, Ramsey, NJ (US)

(73) Assignee: E-Lite Technologies, Inc., Trumbull, CT (US)

( * ) Notice: Subject to any disclaimer, the term of this patent is extended or adjusted under 35 U.S.C. 154(b) by 0 days.

(21) Appl. No.: 10/406,716

(22) Filed: Apr. 3, 2003

(65) Prior Publication Data

US 2003/0189823 A1 Oct. 9, 2003

Related U.S. Application Data

(60) Provisional application No. 60/369,783, filed on Apr. 3, 2002.

(51) Int. Cl.[7] .............................. F21V 9/16; H04B 3/36

(52) U.S. Cl. ......................... 362/84; 362/153; 362/276; 340/332

(58) Field of Search .......................... 362/84, 146, 147, 362/153, 276, 34, 20, 812; 315/86; 40/542, 544; 340/331, 332

(56) References Cited

U.S. PATENT DOCUMENTS 4,534,743 A * 8/1985 D'Onofrio et al. ........... 445/24
5,019,748 A 5/1991 Appelberg ............... 315/169.3
5,343,375 A 8/1994 Gross et al. ................ 362/248
5,724,909 A * 3/1998 Pitman et al. ................ 362/84
5,775,016 A * 7/1998 Chien .......................... 40/544
6,025,773 A * 2/2000 Bresnan ...................... 340/332
6,237,266 B1 * 5/2001 Tassey et al. ................. 40/542
6,472,994 B1 * 10/2002 Tator .......................... 340/332
6,788,000 B2 * 9/2004 Appelberg et al. ............ 315/86
2001/0040798 A1 * 11/2001 Appelberg et al. ............ 362/20

OTHER PUBLICATIONS

Underwriters Laboratories Inc., Standard for Safety, Mar. 30, 1998–UL 1994 UL Std. for Safety for Low Level Path Marking and Lighting Systems, 2nd Ed. Dated Jan. 28, 1997.

Underwriters Laboratories Inc. Standard for Emergency Lighting and Power Equipment, UL 924, 7th Ed. Dated Nov. 29, 1990.

* cited by examiner

*Primary Examiner*—Thomas M. Sember
*Assistant Examiner*—Bao Q. Truong
(74) *Attorney, Agent, or Firm*—Ware, Fressola, Van Der Sluys & Adolphson LLP

(57) ABSTRACT

A path way marking and lighting system utilizes continuous electroluminescent strips of indeterminate length to provide an uninterrupted illuminated path to a target destination such as an egress exit. Powering means responsive to an activation stimulus means are provided to illuminate the electroluminescent strip. Means are provided for self diagnostic testing to carry out one or more sub-system tests to detect system operation within predetermined operating parameters and means provide an alerting indicator in response to a sub-system test detecting a system operation failure.

26 Claims, 6 Drawing Sheets

PATH MARKING AND LIGHTING SYSTEM

This application claims the benefit of Provisional application Ser. No. 60/369,783, filed Apr. 3, 2002.

TECHNICAL FIELD

The present invention relates generally to path marking and lighting systems and methods and deals more particularly with electroluminescent (EL)continuous uninterrupted illuminated path marking and lighting systems and methods.

BACKGROUND OF THE INVENTION

There have been many attempts and systems proposed to provide path marking and lighting systems to provide directional assistance in both emergency and non-emergency applications. Typical emergency guidance and lighting systems in buildings are centralized and often characterized by the presence of a spotlight or pair of spotlights also commonly referred to as "bug eyes" that are mounted toward the ceiling on a wall and contain a battery which is rechargeable from an AC supply. These emergency lights are illuminated throughout the building upon loss of AC power or receipt of an external input signal. There are a number of problems and disadvantages associated with point source illumination devices such as the "bug eyes" lighting systems in both emergency and non-emergency applications. One common disadvantage is the inability to insure the adequacy and integrity of the lighting system particularly as used for emergency lighting due to infrequent, incomplete or missed inspections by regulatory personnel. In instances when such inspections are made, the location of the "bug eyes" lights are such that inspectors cannot reach them to perform tests of the battery reserve which requires operating test buttons for periods of an hour or more. A further disadvantage of "bug eyes" emergency lighting is the inability to provide adequate light intensity at floor levels for egress path lighting particularly in the presence of smoke. A number of systems have been proposed for illuminating exit paths on the wall just above the floor or at floor level recognizing the smoke from a fire will generally obscure light higher up in the room and because crawling below the smoke is often recommended as the safest means of escape. U.S. Pat. No. 5,343,375, granted Aug. 30, 1994 to Gross et al. teaches an emergency lighting strip comprising strings of spaced LED's electrically connected in series in a mounting bracket and a number of strips are used along the path to provide markings. The LED strip lamps of Gross are limited in length complex and do not provide a continuous uninterrupted illuminated path and consume high amounts of power to operate. A 200 foot length of the Gross LED strip lamp would require approximately 108 amperes and be made up of approximately 5400 LED's having 10,800 electrical connections.

Continuous uninterrupted illuminated path marking and light systems that are automatically triggered are particularly well suited to organizations and individuals caring for people with inhibited functions such as developmentally disabled, traumatic brain injury, psychiatric problems, physically disabled, vision impaired or Alzheimer's patients. Typically these individuals can live somewhat autonomously given the proper tools and assisted living devices including means for orienting the individual in the darkness and guiding the individual safely to the restroom and back to their bedroom. It would be desirable therefore to provide a fully integrated, motion activated path marking and lighting system to provide continuous uninterrupted illuminated path marking and designated area lighting for use in special care facilities, group homes, hospitals and other areas.

It is further desirable to provide such a path marking and lighting system in indoor areas where directional lighting is required that can also be integrated with light sensitive or motion sensitive photoelectric cells, smoke detectors and other such sensors. It is further desirable to provide a path marking and lighting system that overcomes the problems associated with other known linear illumination systems including source lighting, LED's, incandescent and fiber optic lighting. Electroluminescent (EL) lamp strips and panels manufactured and sold by Applicant under the trade name "FLATLITE®" provide a continuous uninterrupted illuminated path. The nature of the FLATLITE® electroluminescent product as a lambertian emitter causes limited impairment of night vision and does not dilate the pupils. This makes the product more valuable as a path marking and lighting system than any point source based system such as, for example, LED's, incandescent or "bug eyes" lighting devices.

SUMMARY OF THE INVENTION

In accordance with the invention a pathway marking and lighting system is presented and includes a continuous electroluminescent strip of indeterminate length for providing an uninterrupted illuminated path; powering means responsive to an actuation stimulus means for illuminating the electroluminescent strip; self-diagnostic testing means for carrying out one or more sub-system tests to detect system operation within predetermined operating parameters; and means for providing an alerting indicator in response to a sub-system test detecting a system operation failure.

Preferably, the electroluminescent strip is a split electrode electroluminescent lamp.

Preferably, the electroluminescent strip width is in the range of one-quarter inch.

Preferably, the electroluminescent strip width is in the range of one-quarter inch to two inches.

Preferably, the electroluminescent strip power consumption is in the range of less than 0.05 watts per lineal foot.

Preferably, the electroluminescent strip is foldable to change direction of the uninterrupted illuminated path.

Preferably, the uninterrupted illuminated path follows along a lower wall surface juxtapositioned the walking surface.

Preferably, the uninterrupted illuminated path follows along and is coextensive with the walking surface.

Preferably, the uninterrupted illuminated path follows a stair railing in a stairwell.

Preferably, the electroluminescent strip includes embedded directional indicia.

Preferably, the powering means include a battery having a voltage and electrical current capacity sufficient to illuminate the electroluminescent strip for a predetermined time interval in compliance with regulatory requirements for egress path marking in the event of a commercial power failure.

Preferably, the uninterrupted illuminated path follows to an egress exit.

Preferably, the uninterrupted illuminated path further includes outlining the egress exit with said electroluminescent strip.

Preferably, the activation stimulation means includes motion detector means.

Preferably, the activation stimulation means includes light sensing means.

Preferably, the activation stimulation means includes weight-sensing means.

Preferably, the activation stimulation means includes alarm contacts closure by fire alarm and safety alerting systems.

Preferably, the uninterrupted illuminated path includes outlining the starting point of the passage way and the ending point of a passage way with the electroluminescent strip.

Preferably, the uninterrupted illuminated path provides lighting in compliance with low level lighting and path marking regulatory requirements.

Preferably, the continuous electroluminescent strip of indeterminate length further comprises one or more electroluminescent strip lengths coupled together to provide a desired length dimension uninterrupted illuminated path.

Preferably, the powering means is coupled to one end of the continuous electroluminescent strips.

Preferably, the pathway marking system includes a second continuous electroluminescent strip of indeterminate length adjacent the first continuous electroluminescent strip, the first continuous electroluminescent strip providing an uninterrupted illuminated path having a first indicia representative of the first guidance direction of the path, and the second continuous electroluminescent strip providing an uninterrupted path having a second indicia representative of the second guidance direction of the path.

Preferably, the first indicia is a first color and said second indicia is a second color different from said first color.

BRIEF DESCRIPTION OF THE DRAWINGS

Other features, benefits and advantages of the present invention will become readily apparent from the following written description and drawings wherein.

DESCRIPTION OF PREFERRED EMBODIMENTS

Figure 1:
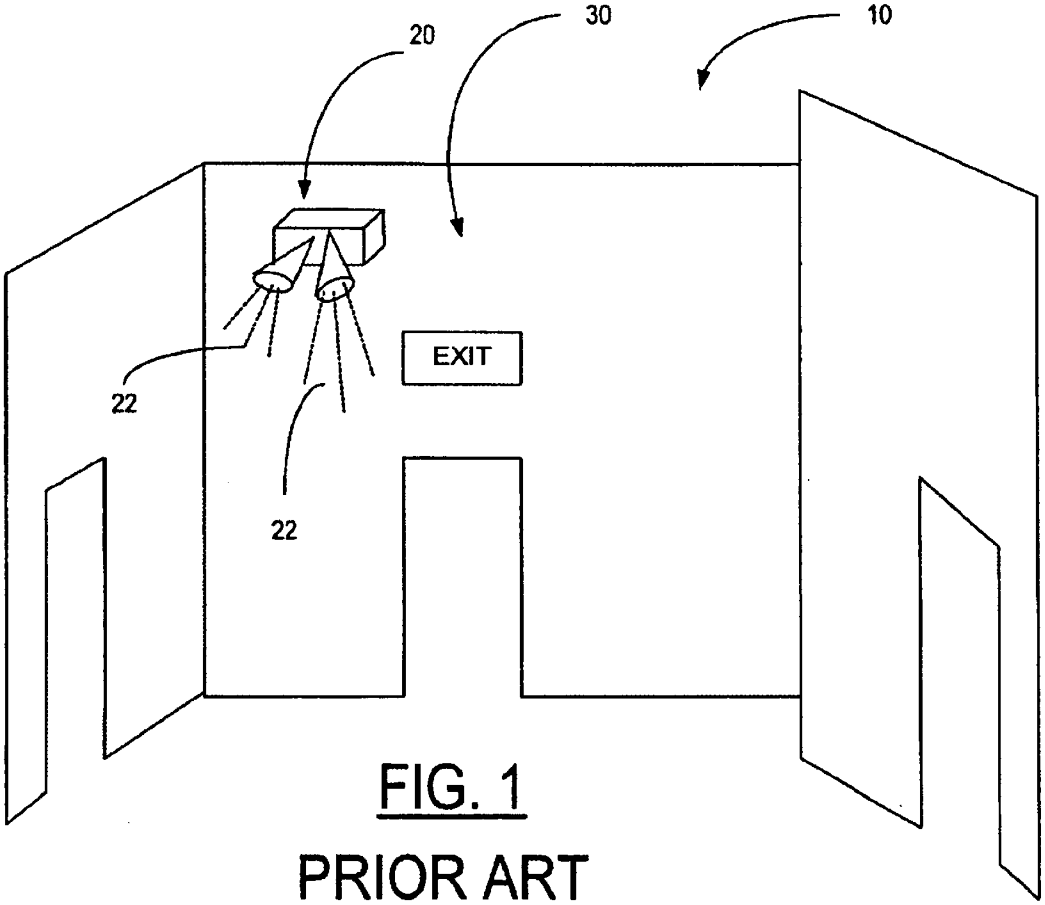
FIG. 1 PRIOR ART
FIG. 1 is a schematic illustration of an area illuminated with a "bug eyes" lighting system of the prior art.

Turning now to the drawings and considering the invention in further detail, a building area such as a hallway is schematically illustrated in FIG. 1 and generally designated 10. A "bug eyes" lighting system as used in the prior art is illustrated and generally designated 20. The "bug eyes" light 20 is typically located on an upper portion of a wall generally in the vicinity of an egress exit as indicated generally 30 in FIG. 1. The operation of "bug eyes" lighting systems are generally well understood in the art and typically include a rechargeable battery to activate the illumination in response to an emergency signal such as a fire alarm or in response to a commercial power failure. As illustrated in FIG. 1, the "bug eyes" lighting device provides light as indicated by the rays 22, 22 to illuminate the area in the vicinity of the exit. As indicated above, "bug eyes" lighting systems of the prior art are not satisfactory to provide directional guidance in emergencies since the light 22 is dispersed by smoke and does not provide the desired intensity at the floor level.

Figure 2:
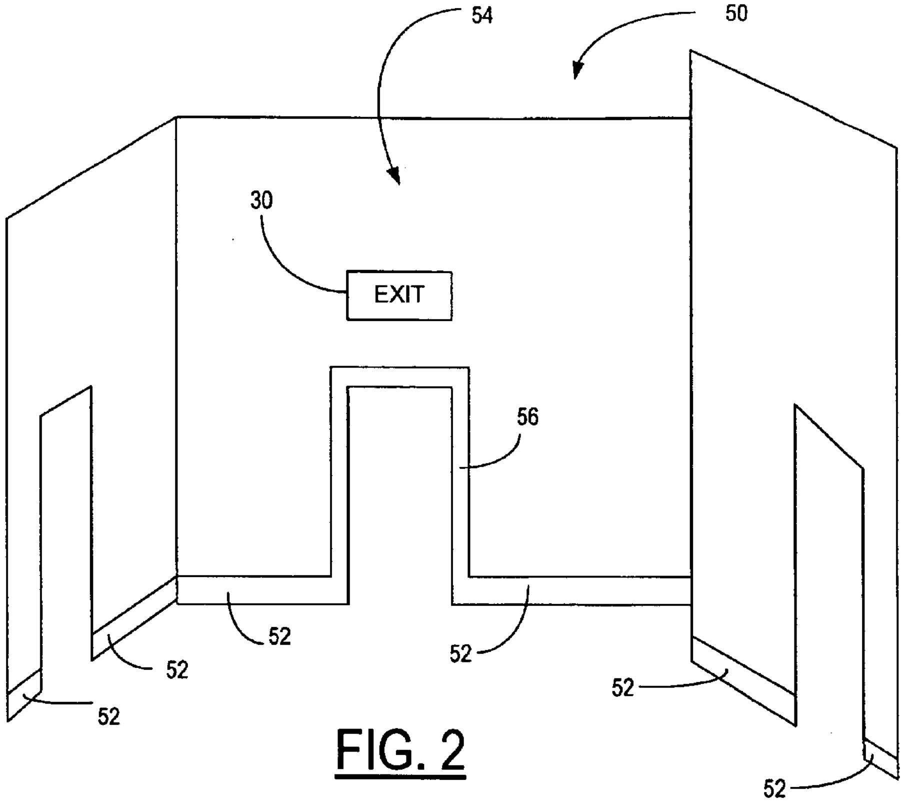
FIG. 2 is a schematic illustration of one embodiment of an electroluminescent path marking system of the present invention.

Turning to FIG. 2, a schematic illustration of one embodiment of an electroluminescent path marking and light system embodying the present invention is illustrated therein as it may be employed in a hallway area to provide directional guidance to an egress exit. In FIG. 2, electroluminescent strips 52, 52 are provided along the wall in the area of the intersection of the wall with the floor typically on or just above a baseboard to mark a continuous uninterrupted illuminated path for directional guidance to the egress exit generally designated 54. The egress exit 54 is also outlined with a continuous electroluminescent strip 56 to outline the egress exit 54 for directional guidance purposes. The electroluminescent strip 56 outlining the egress exit 54 may be of a different color such as green or blue in contrast to the color of the path marking electroluminescent strip 52 which is typically white as a further aid to assist in the directional guidance. The electroluminescent path marking and lighting system as illustrated in FIG. 2 additionally supplements the emergency exit systems typically employed in the building structures. As illustrated in FIG. 2, the egress exit 54 includes an exit sign 60 which typically is illuminated to provide directional guidance in accordance with the requirements of the Underwriters Laboratory Standard for Safety as listed in UL1994. The exit sign 60 may also be powered from and as part of the electroluminescent path marking and lighting system. Such exit signs 60 are well know to those skilled in the art. The activation of the electroluminescent strips 52, 52, 56 may be tied into and activated by the emergency systems in place in the building structure, such as response to fire alarms, commercial AC power failure, or other such activating stimulus. Once such system with which the present invention may be used is disclosed in U.S. patent application Ser. No. 09/852,676 titled "Distributed Emergency Lighting System Having Self-Testing and Diagnostic Capabilities" and assigned to the same Assignee at the present invention and the disclosure of which application is incorporated herein by reference.

Figure 3:
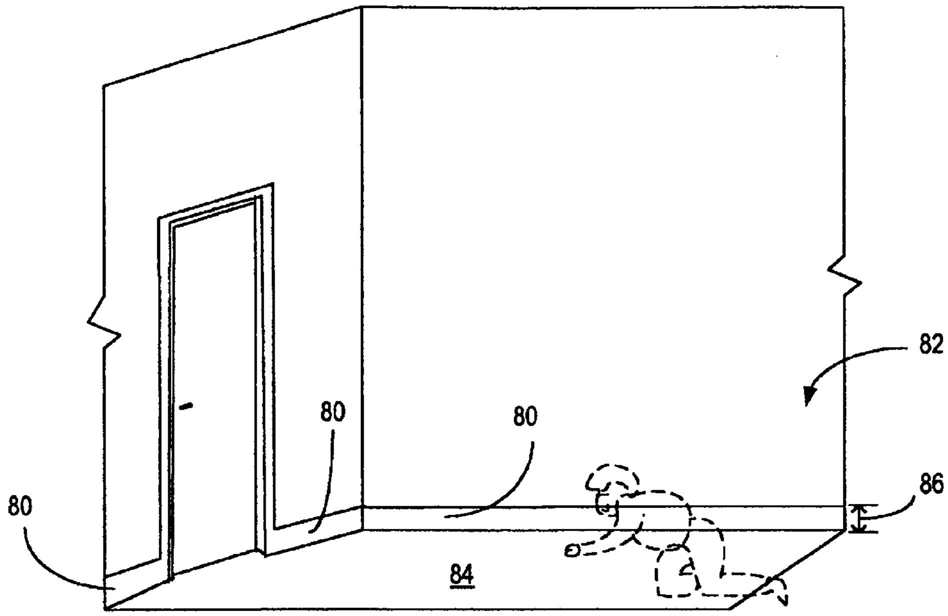
FIG. 3 is a schematic illustration of another embodiment of an electroluminescent path marking and lighting system of the present invention.

The electroluminescent path marking and lighting system of the present invention may also be used to provide low level lighting in accordance with the requirements of the Underwriters Laboratory Standard for Safety for low level path marking and lighting systems as listed in UL 1994 and is illustrated schematically in FIG. 3. In FIG. 3, an electroluminescent strip generally designated 80 is provided on a lower portion 82 of the wall surface approximately in the vicinity of the intersection of the wall surface and the floor 84 to provide illumination on the floor for visibility in high smoke environments. The width 86 of the electroluminescent strip 80 is selected to provide the desired illumination intensity that the floor level 84 in accordance with the UL 1994 requirements. The electroluminescent strip 80 not only provides a long continuous uninterrupted illuminated path but also provides the desired low level lighting to assist an individual to identify and locate an egress exit. Preferably, the width 86 of the electroluminescent strip 80 is in the range of one-quarter inch to two inches although the continuous electroluminescent strip is available in any width dimension up to and including twenty-four inches in continuous rolls of over 700 feet in length. Accordingly, the specific width dimension selected will be dictated by the specific path marking and lighting requirements.

Figure 4:
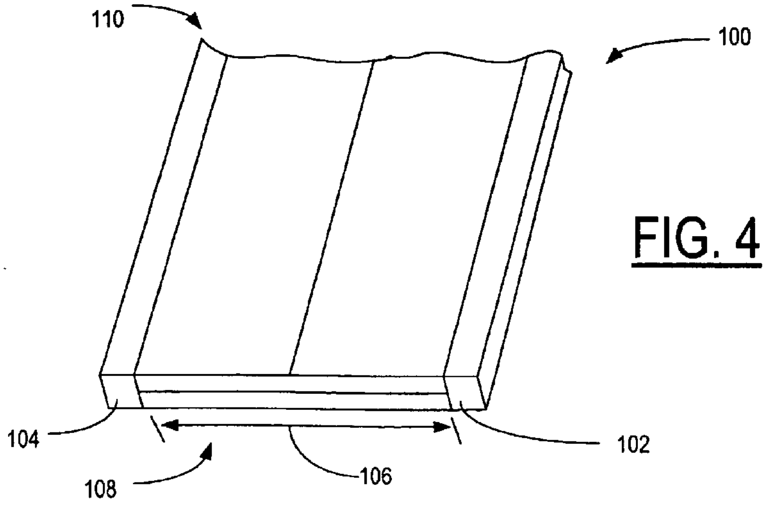
FIG. 4 is a schematic representation of a segment of a split electrode electroluminescent strip used in one embodiment of the path marking and lighting system of the present invention to provide a continuous uninterrupted illuminated path.

Turning now to FIG. 4, a schematic representation of a segment of a split electroluminescent strip as used in the path marking and lighting system of the present invention to provide a continuous uninterrupted illuminated path is illustrated therein and generally designated 100. The electroluminescent lamp material comprising the electroluminescent strip is available from E-Lite Technologies, Inc, the Applicant in the present invention, under the trade name "FLATLITE®". The electroluminescent strip is a split electrode parallel plate construction which allows the electroluminescent strip to be extremely long up to approximately 700 feet with low electrical current and uniform brightness, for example, a 200 foot, one-half inch wide electroluminescent strip draws less than one-half ampere of electrical current. The reader may consult the product description literature and design and application guidelines for the "FLATLITE®" electroluminescent strip product for specifications and operating parameters and a copy of which literature and guidelines are attached hereto and incorporated by reference. Details of the manufacture of the electroluminescent strip are found in U.S. Pat. No. 5,019,748 assigned to the same Assignee as the present invention and titled "Method for Making An Electroluminescent Panel Lamp as Well as Panel Lamp Produced Thereby" and application Ser No. 09/888,954 also assigned to the same Assignee as the present invention titled "Method and Apparatus for Making Large Scale Laminated Foil Backed Electroluminescent Lamp Material, as Well as the Electroluminescent Lamps and Strip Lamps Produced Therefrom", both of which disclosures are incorporated herein by reference. The electroluminescent strip 100 typically has a protective laminate 102, 104 at either side of the strip and is approximately one-eighth inch wide so that the strip is approximately one-quarter inch greater than the nominal lamp width 106. The electroluminescent strip 100 may be powered from both ends 108, 110, or either end or at multiple points along the electroluminescent strip in accordance with the powering requirements as set forth and defined in the FLATLITE® electroluminescent lamp specifications. Powering from both ends or at multiple points along the electroluminescent strip adds to the robustness of the system, provides an additional degree of reliability and redundancy in the event the electroluminescent strip is cut or severed due to building damage or other reasons. Electrical connections to and from the FLATLITE® electroluminescent strip are made with lead connectors and tools made specifically for the purpose and available from the Applicant E-Lite Technologies, Inc and such connectors and tools are described in Applicant's literature titled "How to Connect FLATLITE® Electroluminescent Lamps", a copy of which is attached hereto and incorporated by reference. A further feature of the electroluminescent strip utilized with the path marking and lighting system of the present invention is the electroluminescent strip 100 is flexible and may be bent to accommodate folding around inside and outside corners, for example, around the corners of a doorway or around a corner of a wall surface. The electroluminescent strip 100 may also pass over or under objects in a continuous manner as required. The electroluminescent strip 100 may also pass over or under objects in a continuous manner as required. Thus the FLATLITE® electroluminescent strip provides flexibility for application to any surface area and configuration.

Figure 5:
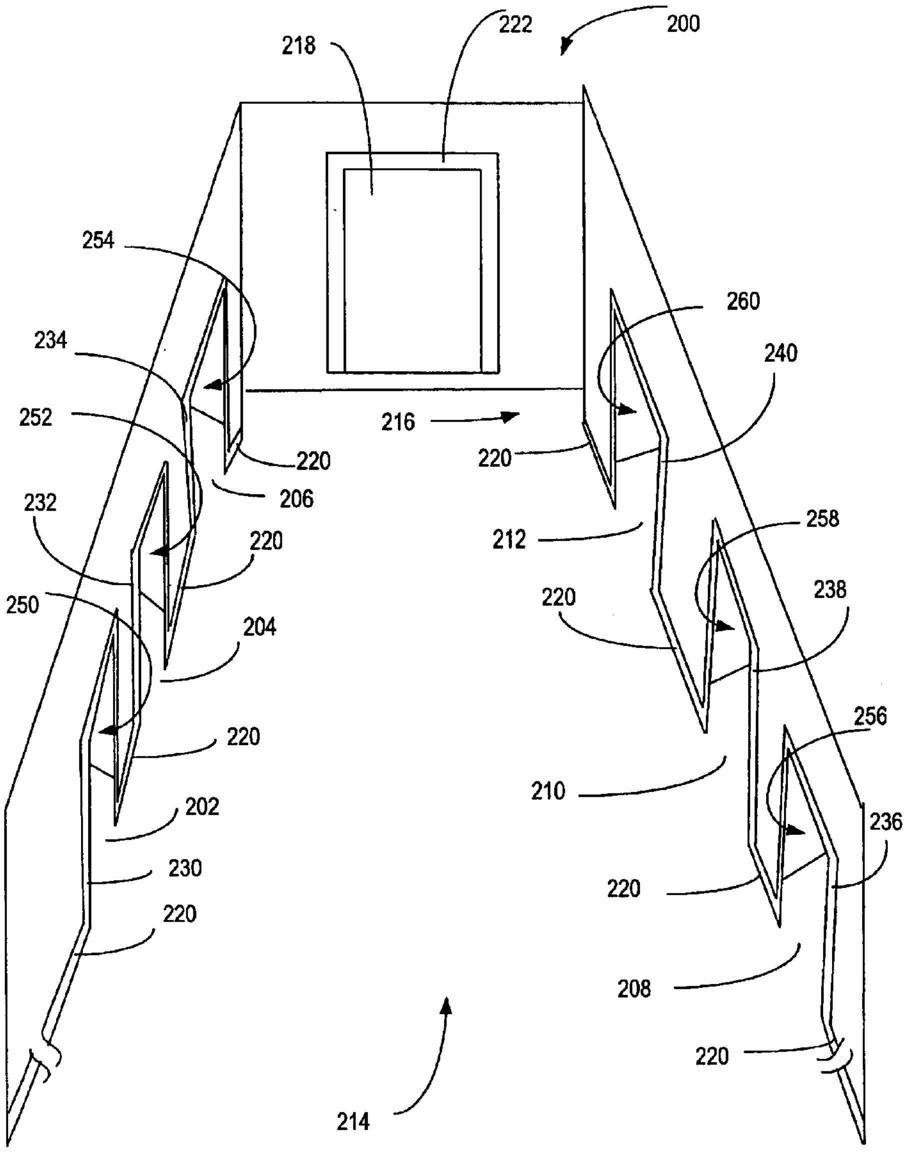
FIG. 5 is a schematic illustration of one embodiment of a path marking and lighting system of the present invention as it might be employed in an assisted living environment.

Turning now to FIG. 5, a schematic illustration of a further embodiment of a path marking and lighting system of the present invention as it might be employed in an assisted living environment is illustrated therein and generally designated 200. As illustrated, FIG. 5 represents a number of doorways 202, 204, 206, 208, 210, 212 fronting in a hallway area generally designated 214 of indeterminate length and shown terminating at the intersection 216 of a subsequent hallway having a door or other room or entry generally designated 218. A strip of electroluminescent material 220 is located along the hallway 214 at the baseboard level to provide a continuous uninterrupted illuminated path when activated along the hallway 214 to the door 218. The door 218 may further be outlined with an electroluminescent strip 222 to further assist in the directional guidance of an individual along the hallway 214. In this embodiment, each of the respective doors 202–212 are also outlined with an electroluminescent strip 230–240 respectively, to provide directional guidance to the respective entries as further described below.

For purposes of example, the path marking and lighting system 200 illustrated in FIG. 5 is an automatically triggered path marking and lighting system for orienting an individual in darkness and guiding the individual to a predetermined target destination, for example, a restroom, and then safely back to their point of origination such as their bedroom. If by way of example, each of the door entries 202–212 respectively, lead to individual bedrooms for example as may be found in an assisted living center, convalescent home, or other such facility, area illumination and directional guidance is particularly important especially in night time hours. In this embodiment, the path marking and lighting system is activated by a photoelectric sensor (not illustrated) preferably located outdoors of the living residence to avoid false triggering by lights turning on and off and which photoelectric and which photoelectric sensor operates at a predetermined level of darkness. The basic system comprising the electroluminescent strips 220, 220 and the electroluminescent strip 222 surrounding the door 218 are activated and provide illumination when the predetermined level of darkness is reached. In this situation an individual exiting one of the entries 202, 212 respectively, would be guided to the door 218 via the electroluminescent strips 220 at the baseboard level and the electroluminescent strip 222 illuminated outlining the door 218. If it is considered that the door 218 leads to a restroom for example, a larger panel of the FLATLITE® electroluminescent material may be installed on the ceiling of the restroom for lighting the room without the need to activate the primary lighting of the restroom. The ceiling lighting may be activated when the predetermined level of darkness is reached as detected by the photoelectric sensor or may be activated in response to some other stimulus such as a motion detector or other sensor. Preferably, the illumination provided by the FLATLITE® electroluminescent material installed on the restroom ceiling provides low level lighting any time the system is activated by the photoelectric sensor. If the full lighting intensity of the primary lighting system in the restroom is required, the low level lighting from the FLATLITE® electroluminescent material installed on the restroom ceiling will allow the person to easily navigate to operate the primary lighting system light switch.

In a further embodiment, each of the respective strips 230–240 are individually activated via sensing means located within the room area generally designated 250, 252, 254, 256, 258, 260, respectively such that the electroluminescent strip is illuminated upon activity or motion of an individual in the room area. For example, an individual may be detected via a motion detector or a weight sensing pad located on the floor, for example, beside a bed so that the individual's movement as detected by the motion detector or sensed by a weight sensing pad will activate the corresponding strip 230–240 in addition to the hallway pathway marking electroluminescent strips 220 to guide the individual to the destination or target area, for example, a restroom indicated by the illuminated electroluminescent strip 222. When the individual attempts to return to their room, the corresponding illuminated electroluminescent strip outlining the respective room area corresponding to the individual is illuminated and serves as directional guidance for the individual back to their respective room. Upon detecting motion within the room the corresponding electroluminescent strip outlining the doorway extinguishes after a time delay. If multiple individuals are up and exit their room areas at the time the others have exited their room areas, their respective doorways may be illuminated with different color electroluminescent strips so that the individual recognizes their room and will return to the correct room. Likewise, if there are different restrooms for example, men's and women's rooms they likewise may be identified by a different color electroluminescent strip outlining the respective doorways. In addition to providing directional guidance, the path marking and lighting system of the present invention can also be used for monitoring by the caregivers or individuals responsible for the people in the residence wherein the sensor means in addition to activating the light in the room and providing directional guidance can further activate an indicator light or other indicator means at the central monitoring station for example, a nurse's station. The responsible caregiver may visually look down the hallway to see which doorway is illuminated to determine from which particular room an individual has exited or is up and out of bed as the case may be and respond accordingly.

The room areas may further have a larger panel of the FLATLITE® electroluminescent material installed within the room area to provide low level lighting which could be automatically triggered and activated by the movement of the individual within the room to provide adequate lighting for the individual to walk about without turning on the primary room lighting. In addition, an attendant or caregiver entering the room for example, would be detected by the motion detector which would illuminate the FLATLITE® electroluminescent panel to provide sufficient lighting to allow the caregiver or attendant to inspect the interior of the room or to administer to the individual in the room without turning on the primary lighting. The FLATLITE® electroluminescent material whether in panel form to provide low level lighting or in strip form may be installed utilizing known extrusions, for example, clear, transparent non-metallic raceway systems manufactured by WireMold or other systems now known or future developed. In addition, the FLATLITE® electroluminescent material may be provided with a releasable adhesive backing and held in place on the wall surface or other desired surface areas. Other suitable mounting means now known or future developed are also contemplated.

Figure 6:
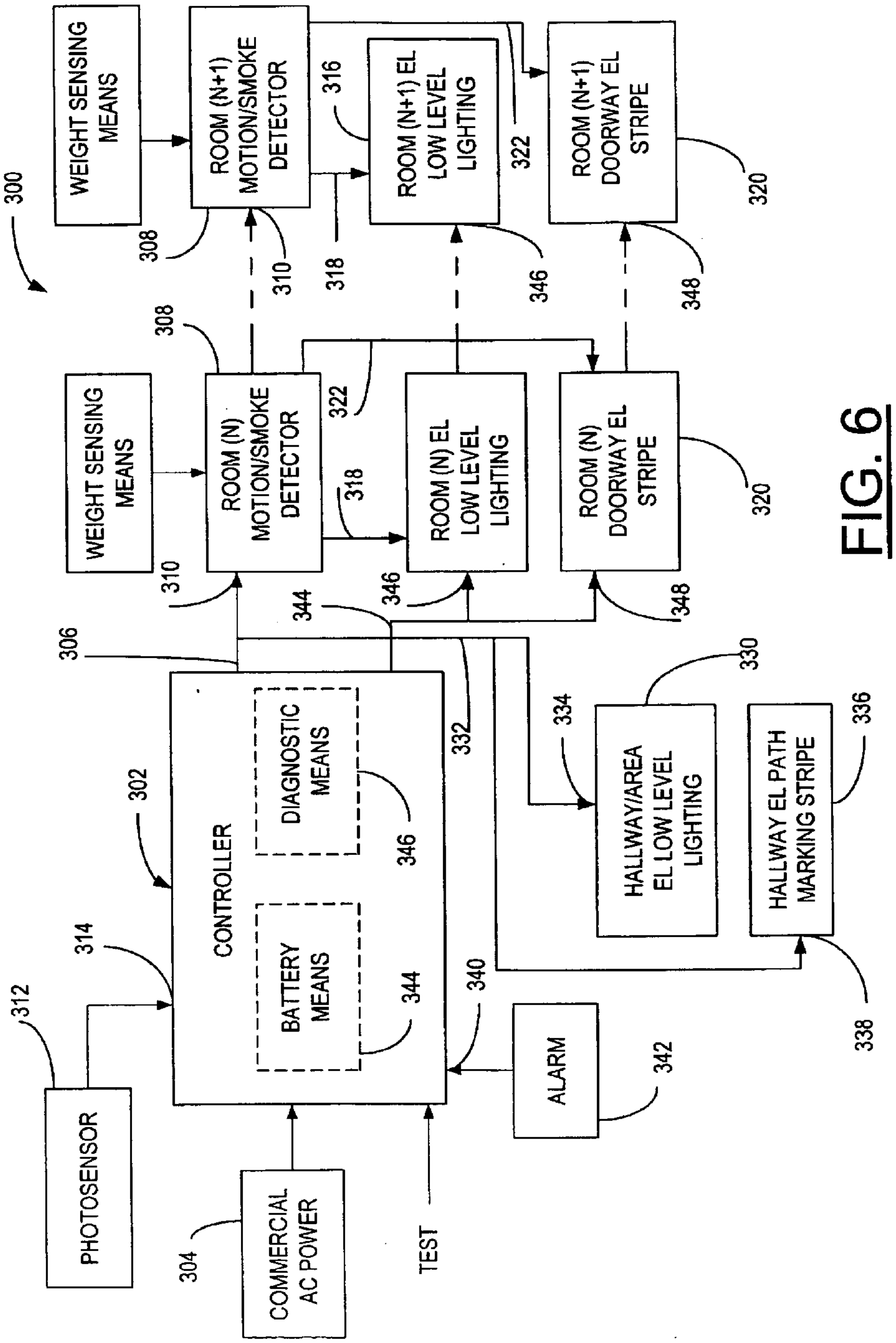
FIG. 6 is a schematic functional block diagram showing one possible implementation of the path marking and lighting system as it might be employed in the assisted living environment described in conjunction with FIG. 5.

Turning now to FIG. 6, a schematic functional block diagram showing one possible implementation of the path marking and lighting system of the present invention as it might be employed in the assisted living environment described in conjunction with FIG. 5 is illustrated therein and generally designated 300. The system 300 includes a controller 302 coupled to a source of commercial AC power 304 and which provides power at its output 306 for powering the electroluminescent low level lighting panel and electroluminescent strips. The power provided at the output 306 is of the appropriate voltage and frequency to illuminate the FLATLITE® electroluminescent material and which power requirements are provided in the specification and operating data sheets for the FLATLITE® electroluminescent material and to which data sheets and to which the leader is referred to for additional details and which data sheets are incorporated herein by reference. Each of the room areas includes a motion/smoke detector 308, 308 having an input 310 coupled to the power output lead 306 of the controller 302. Alternately or in addition to the motion/smoke detector 308, a weight sensing pad 309 may be used to detect the presence of an individual. The controller 302 provides power at its output 306 in response to the output of a photosensor 312 indicating that a predetermined level of darkness has been reached and which photosensor 312 provides its output to the input 314 of the controller 302. Upon detection of movement or other alarm conditions such as smoke, the motion/smoke detector 308 transfers power from its input 310 to the room electroluminescent low level FLATLITE® lighting panel 316 via the lead 318. Likewise, power is transferred to the room doorway electroluminescent strip 320 via the lead 322 to illuminate the electroluminescent strip. Power is also provided to the hallway/area electroluminescent low level FLATLITE® lighting panels 330 via the lead 332 coupled to the input 334. Power is also provided to the hallway electroluminescent path marking strips 336 via the input 338 coupled to the lead 332. The controller 302 is also responsive to an alarm signal at is input 340 generated by an external alarm device 342 which may be a standard fire alarm system output signal or some other supervisory output signal. In response to the alarm 342, the controller 302 provides power on the lead 344 to the input 346 of the room electroluminescent low level FLATLITE® lighting panel 316 and to the input 348 of the room doorway electroluminescent strip 320 to illuminate the low level lighting and the electroluminescent strip in response to an alarm condition.

The controller 302 includes battery means 344 to provide power for the electroluminescent low level lighting panels and the electroluminescent strips in the event of a commercial AC power failure. The controller 302 also includes diagnostic means 346 for carrying out sub-system tests, monitoring of system components and operation providing alarm indication and signaling both locally and remotely from the controller location monitoring the condition and charge capacity status of the battery to insure the battery maintains adequate charge to operate the system and to communicate alarm conditions and system status as required.

Figure 7:
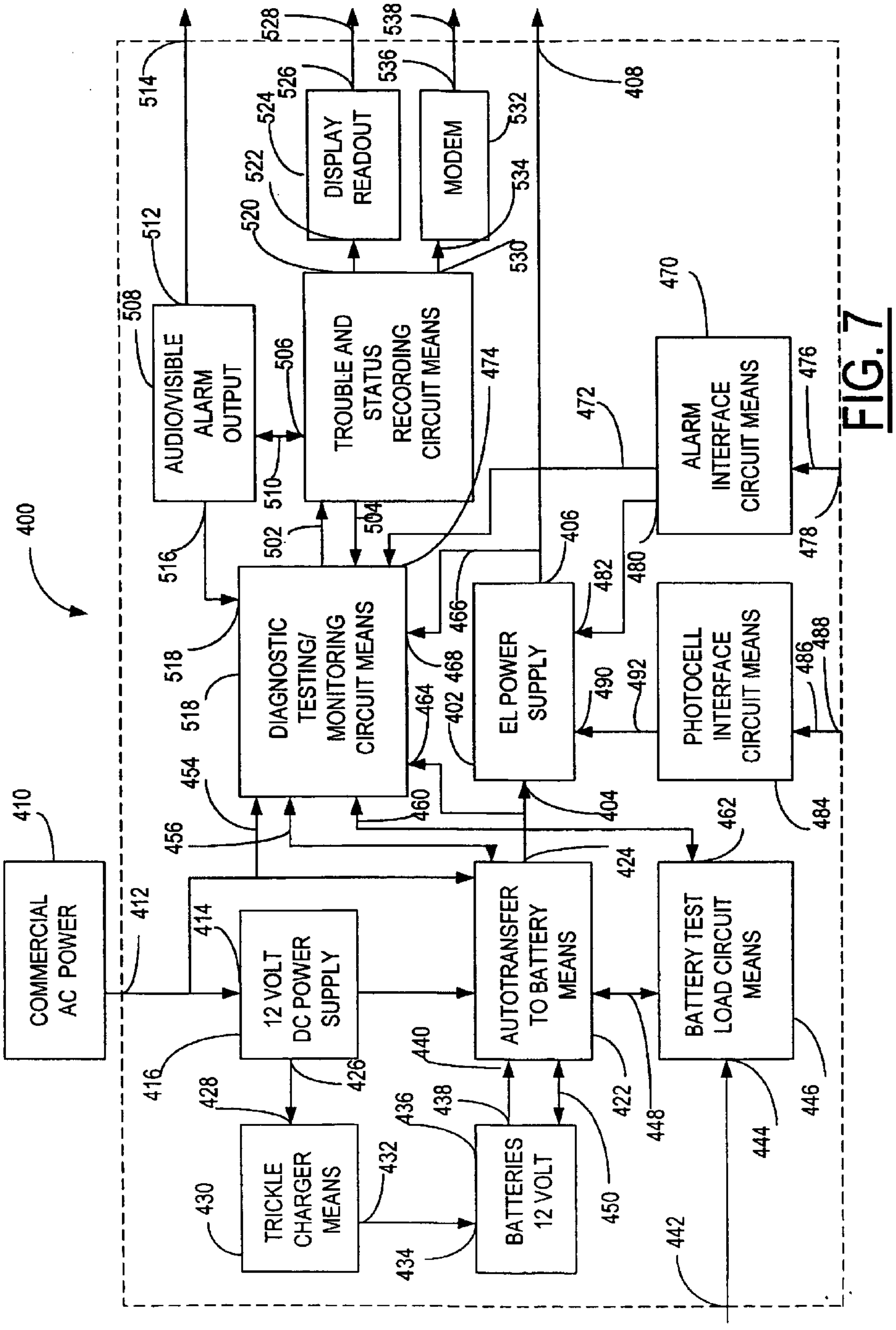
FIG. 7 is a schematic functional block diagram of one embodiment of a controller employed in the path marking and lighting system of the present invention.

Turning now to FIG. 7, a schematic functional block diagram one embodiment of a controller employed in the path marking and lighting system of the present invention is illustrated therein and generally designated 400. The controller 400 includes an electroluminescent power supply generally designated 402 which operates from a DC voltage input 404 and provides the appropriate AC voltage and current at its output 406 to power FLATLITE® electroluminescent material connected to the output 408 of the controller. The electroluminescent power supply 402 is available from E-Lite Technologies, Inc., the Applicant in the present invention. The controller 400 operates from a commercial AC power source 410 which may be conventional 110 volt/220 volt AC power. The commercial AC power source 410 is coupled to the input 412 of the controller 400 and is further coupled to the input 414 of a 12 volt DC power supply 416 and which automatically selects between the 110/220 volt input to provide 12 volt DC voltage potential at its output 418 which is coupled to the input 420 of an automatic transfer-to-battery switch circuit means 422 which provides the 12 volt DC voltage potential at its output 424. The output 424 is coupled to the input 404 of the electroluminescent power supply 402. The 12 volt DC power supply 416 also provides a 12 volt DC voltage potential at the output 426 which is coupled to the input 428 of a trickle charger circuit means 430. The trickle charger means 430 provides a 12 volt DC voltage potential and appropriate charging current at its output 432 which is coupled to the input terminals 434 of 12 volt batteries 436. The 12 volt batteries 436 are typically 12 volt lead acid batteries and have a reserve capacity of approximately 6 ampere hours. The actual reserve capacity is dependent on the power load of the path marking and lighting system. The battery 436 output 438 is coupled to the input 440 of the auto-transfer-to-battery switch circuit means 422 in the event of a commercial AC power failure, the auto-transfer-to-battery switch circuit means 422 transfers the DC voltage at the input 440 to its output 424 coupled to the input 404 of the electroluminescent power supply 402 to operate and power the FLATLITE® electroluminescent low voltage lighting and path marking strips for a time interval in compliance with the requirements set forth in the regulatory requirements for Underwriters Laboratories and also in compliance with local requirements. In order to insure that the 12 volt batteries 436 have sufficient capacity reserve to operate the electroluminescent low level lighting and path marking strips for the required time intervals, a battery test is applied either manually by operating a switch at the input 442 to the controller which is coupled to the input 444 of the battery test load circuit means 446 which provides an electrical load to the batteries 436 via the lead 448 coupled through the auto-transfer-to-battery switch circuit means 422 to the batteries via the lead 450. The battery test load circuit means 446 includes processing means to apply a programmed power load proportional in time to the load presented by the electroluminescent low level lighting and electroluminescent path marking strips for the time period required in the regulatory specifications to maintain the lighting. The voltage of the battery sensed at the conclusion of the power program determines the status of the battery capacity and the success of the charging circuit to maintain the battery at the required reserve capacity. The sensing is done via the lead 450 through the auto-transfer-to-battery switch circuit means 422 back to the battery test load circuit means 446 via the lead 448. The test is carried out in a matter of minutes rather than through the holding of a test button for extended periods of time between one hour and two hours as required in prior art systems.

A diagnostic testing/monitoring circuit means 452 receives signals from the various components and has in some instances bi-directional communication with the various components in order carry out the testing and monitoring functions. Input 454 of the diagnostic circuit means 452 is coupled to the AC power source to sense the presence or absence of the commercial AC power input. Input 456 is coupled to the auto-transfer-to-battery switch circuit means 422 at the input 458 to monitor the test status of the auto-transfer circuit. Input 460 of the diagnostic testing/monitoring circuit 452 is coupled to the battery testing load circuit means 446 at its input 462 and monitors the status of the testing, the resulting conclusion of the testing, and other relevant data signals provided by the processing means of the battery test load circuit means 446. Input 464 of the diagnostic testing/monitoring circuit means 452 is coupled to the 12 volt DC input to the electroluminescent power supply 402 and monitors the status and presence of the 12 volt DC input. The output voltage of the electroluminescent power supply is monitored by the diagnostic testing/monitoring circuit means 452 via the lead 466 coupled between the output 406 and the input 468. The status of the alarm interface circuit means 470 is monitored via the lead 472 coupled between the alarm interface circuit means and the input 474 of the diagnostic testing/monitoring circuit means 452. The alarm interface circuit means 470 receives an input signal via lead 476 coupled to the input 478 of the controller 400 and which alarm signal may be a standard fire alarm system or other standard building alerting systems. The alarm interface circuit means 470 also has an output 480 coupled to the input 482 of the electroluminescent power supply 402 which may be used to override any sensing devices coupled to the controller 400. A photocell interface circuit means 484 is coupled via the lead 486 to the input 488 of the controller 400 to receive a signal from an external photosensor indicating that a predetermined level of darkness is reached. The photocell interface circuit means 484 provides an activation signal to the input 490 of the electroluminescent power supply 402 via the lead 492 to enable the electroluminescent power supply 402 to provide the desired output voltage at the controller output 408.

The controller 400 also includes a trouble and status recording circuit means 500 which is coupled to the diagnostic testing/monitoring circuit means 452 via the leads 502, 504 to send an receive data information and alerting signals to and from the diagnostic testing/monitoring circuit means 452. The trouble and status recording circuit means 500 has an output 506 coupled to an audio/visible alarm output means 508 via the lead 510 to cause the audio/visible alarm output means 508 to produce an appropriate signal at its output 512 to drive external alarms, indicators, and other signaling devices coupled to the output 514 of the controller 400. The audio/visible alarm output means 508 also has an output 516 coupled to an input 518 of the diagnostic testing/monitoring circuit means 452. The trouble and status recording circuit means 500 further includes means coupled via its output 520 to the input 522 of a display readout means 524 which may be in the form of LED's, LCD displays, or other readout devices typically known in the art. The display readout 524 may be operated manually or may be automatic to provide an alpha/numeric/graphic representation of the information provided at the output 520. The information may include a readout of the system status, trouble history, error codes or other information typically used in the maintenance and monitoring of an electrical system. The display readout means 524 also has an output 526 to provide this information to external devices coupled to the output 528 of the controller 400. Alternately, the trouble and status recording circuit means 500 may have an output 530 coupled to a modem 532 to transmit information regarding the system present at its input 534 via its output 536 coupled to the output 538 of the controller to transfer this information to external devices connected thereto. Alternately, the modem may be a dial-up or telephone type modem operating over standard telephone signal wires or alternately may be a cellular type modem operating in a wireless manner well known to those skilled in the art. The output 538 may further be connected directly to the global computer network (internet) to transfer information as required. The above and other types of signaling and signaling systems to provide off site signaling or off site monitoring are well known to those skilled in the art and the invention contemplates usage of devices now known or future developed.

The diagnostic testing/monitoring circuit means 452 also monitors the battery condition to provide a fail safe operating mode to indicate if the batteries 436 had been activated and discharged in the absence of personnel being present. An appropriate alarm signal would be generated via the trouble and status recording circuit means 500 and audio/visible alarm output means 508 indicating the batteries are discharged beyond an acceptable level. The path marking and lighting system could be brought off-line and alarm signals transmitted to appropriate personnel to alert them the AC power has failed and the batteries require changing.

Figure 8:
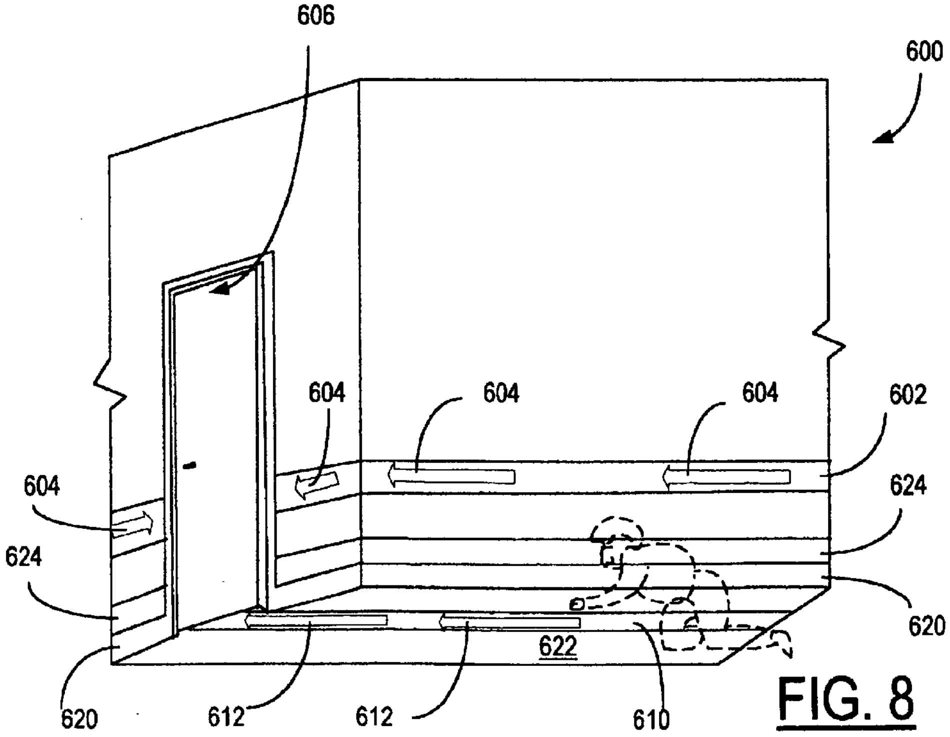
FIG. 8 is a schematic illustration of a further embodiment of an electroluminescent path marking and lighting system of the present invention.

Turning now to FIG. 8, a schematic illustration of a further embodiment of an electroluminescent path marking and lighting system of the present invention is illustrated therein and generally designated 600. The electroluminescent strip may include embedded indicia and for example, an electroluminescent strip 602 is illustrated along a wall surface and includes indicia indicated as direction arrows 604, 604 embedded in the electroluminescent strip surface. The arrows 604 may be of a different color to contrast with the illuminated electroluminescent strip 602 to provide the directional guidance to the egress door indicated generally at 606. The arrows 604, 604 may likewise be made of the electroluminescent material however of a different color that also is illuminated along with the electroluminescent strip 602 to provide better visibility and direction. The electroluminescent strip may also be applied as part of the walking surface and is generally designated 610. The electroluminescent strip 610 may also include indicia such as the direction arrows 612, 612 to provide directional guidance to an individual attempting to locate the egress door 606. A further directional guidance may be achieved by utilizing a first continuous electroluminescent strip 620 mounted on the wall surface juxtapositioned to the floor surface 622 and leading to the egress door 606. A second continuous electroluminescent strip 624 is mounted adjacent to the first electroluminescent strip 620 also leading to the egress door 606. The first electroluminescent strip 620 may contain a first indicia to assist in directional guidance and the electroluminescent strip 624 may contain a second indicia different than the first indicia for directional guidance. The first indicia may be one color representing the directional of the path to the egress door 606 and the second electroluminescent path 624 may have a second indicia which may be a color different than the first color and indicates a direction opposite to that of the first guidance direction. The ability to illuminate one or the other of the continuous electroluminescent strips 620, 624 is particularly important in more modem building wherein the alarm and emergency egress systems are computer controlled and it is desired to lead an individual in a preferred given direction for purposes of safety and egress. For example, if the fire for example were behind the egress door 606 the appropriate electroluminescent strips 620, 624 would be illuminated to indicate the exit direction should be opposite from the egress door 606 to another egress door within the prescribed building.

A path marking and lighting system has been described above in several preferred embodiments for purposes of illustration of the present invention. Numerous changes, additions and modifications may be made by those skilled in the art without departing from the spirit and scope of the invention and therefore the invention has been described by way of illustration rather than limitation.

What is claimed is:

1. A pathway marking system, comprising:

a first continuous electroluminescent strip of indeterminate length for providing an uninterrupted illuminated path;

powering means responsive to an actuation stimulus means for illuminating said electroluminescent strip;

self-diagnostic testing means for carrying out one or more sub-system tests to detect system operation within predetermined operating parameters; and means for providing an alerting indicator in response to the one or more sub-system tests detecting a system operation failure.

2. The pathway marking system as defined in claim 1 wherein said electroluminescent strip is a split electrode electroluminescent lamp.

3. The pathway marking system as defined in claim 1 wherein the electroluminescent strip width is in the range of one-quarter inch.

4. The pathway marking system as defined in claim 1 wherein the electroluminescent strip width is in the range of one-quarter inch to two inches.

5. The pathway marking system as defined in claim 3 wherein the electroluminescent strip power consumption is in the range of less than 0.05 watts per lineal foot.

6. The pathway marking system as defined in claim 1 wherein the electroluminescent strip is foldable to change direction of the uninterrupted illuminated path.

7. The pathway marking system as defined in claim 1 wherein the uninterrupted illuminated path follows along a lower wall surface juxtapositioned the walking surface.

8. The pathway marking system as defined in claim 1 wherein the uninterrupted illuminated path follows along and is coextensive with the walking surface.

9. The pathway marking system as defined in claim 1 wherein the uninterrupted illuminated path follows a stair railing in a stairwell.

10. The pathway marking system as defined in claim 1 wherein said electroluminescent strip includes embedded directional indicia.

11. The pathway marking system as defined in claim 1 wherein the uninterrupted illuminated path follows to an egress exit.

12. The pathway marking system as defined in claim 1 wherein the uninterrupted illuminated path further includes outlining the egress exit with said electroluminescent strip.

13. The pathway marking system as defined in claim 1 wherein said powering means include a battery having a voltage and electrical current capacity sufficient to illuminate said electroluminescent strip for a predetermined time interval in compliance with regulatory requirements for egress path marking in the event of a commercial power failure.

14. The pathway marking system as defined in claim 1 wherein said activation stimulation means includes motion detector means.

15. The pathway marking system as defined in claim 1 wherein said activation stimulation means includes light sensing means.

16. The pathway marking system as defined in claim 1 wherein said activation stimulation means includes weight sensing means.

17. The pathway marking system as defined in claim 1 wherein said activation stimulation means includes alarm contacts closure by fire alarm and safety alerting systems.

18. The pathway marking system as defined in claim 1 wherein the uninterrupted illuminated path includes outlining the starting point of a passage way and the ending point of a passage way with said electroluminescent strip.

19. The pathway marking system as defined in claim 1 wherein said uninterrupted illuminated path provides lighting in compliance with low level lighting and path marking regulatory requirements.

20. The pathway marking system as defined in claim 1 wherein said continuous electroluminescent strip of indeterminate length further comprises one or more electroluminescent strip lengths coupled together to provide a desired length dimension uninterrupted illuminated path.

21. The pathway marking system as defined in claim 1 wherein said powering means is coupled to one end of said continuous electroluminescent strip.

22. The pathway marking system and defined in claim 1 further including a second continuous electroluminescent strip of indeterminate length adjacent the first continuous electroluminescent strip, said first continuous electroluminescent strip providing an uninterrupted illuminated path having a first indicia representative of the first guidance direction of the path, and said second continuous electroluminescent strip providing an uninterrupted path having a second indicia representative of the second guidance direction of the path.

23. The pathway making system as defined in claim 22 wherein said first indicia is a first color and said second indicia is a second color different from said first color.

24. The pathway marking system as defined in claim 1 wherein said powering means is coupled to each end of said continuous electroluminescent strip.

25. The pathway marking system as defined in claim 1 wherein said powering means is coupled to multiple locations along said continuous electroluminescent strip.

26. The pathway marking system as defined in claim 1 an exit sign is part of said continuous electroluminescent strip.

* * * * *

UNITED STATES PATENT AND TRADEMARK OFFICE

CERTIFICATE OF CORRECTION

PATENT NO. : 6,896,388 B2
DATED : May 24, 2005
INVENTOR(S) : George et al.

It is certified that error appears in the above-identified patent and that said Letters Patent is hereby corrected as shown below:

Column 11,
Line 55, "modem" should be -- modern --.

Signed and Sealed this

Thirtieth Day of August, 2005

JON W. DUDAS
*Director of the United States Patent and Trademark Office*